US011553817B2

(12) United States Patent
Jin et al.

(10) Patent No.: US 11,553,817 B2
(45) Date of Patent: Jan. 17, 2023

(54) FOOD PROCESSING APPARATUS, CONTROL DEVICE AND OPERATING METHOD

(71) Applicant: KONINKLIJKE PHILIPS N.V., Eindhoven (NL)

(72) Inventors: Yafang Jin, Shanghai (CN); ZhongChi Luo, Shanghai (CN); Haitao Feng, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 17 days.

(21) Appl. No.: 16/467,095

(22) PCT Filed: Dec. 6, 2017

(86) PCT No.: PCT/EP2017/081595
§ 371 (c)(1),
(2) Date: Jun. 6, 2019

(87) PCT Pub. No.: WO2018/104351
PCT Pub. Date: Jun. 14, 2018

(65) Prior Publication Data
US 2019/0387922 A1 Dec. 26, 2019

(30) Foreign Application Priority Data

Dec. 8, 2016 (WO) ................ PCT/CN2016/000676
Mar. 20, 2017 (EP) ..................................... 17161734

(51) Int. Cl.
A47J 37/06 (2006.01)
A23L 13/50 (2016.01)
(Continued)

(52) U.S. Cl.
CPC ............. A47J 37/0641 (2013.01); A21B 1/26 (2013.01); A23L 5/15 (2016.08); A23L 5/17 (2016.08);
(Continued)

(58) Field of Classification Search
CPC ..... A47J 37/0641; A47J 36/321; A23L 13/50; A23L 17/00; A23L 5/17; A23L 5/15; A21B 1/26; F24C 15/32
See application file for complete search history.

(56) References Cited

U.S. PATENT DOCUMENTS 3,916,670 A * 11/1975 Davis ..................... G01N 33/12
374/14
4,299,115 A * 11/1981 Athey .................... G01N 33/12
219/708

(Continued)

FOREIGN PATENT DOCUMENTS

CN 1067788 A 1/1993
CN 1835687 A 9/2006
(Continued)

OTHER PUBLICATIONS

Sheard, et al., "The effect of cooking on the chemical composition of meat products with special reference to fat loss", Meat Science. vol. 49. No. 2. 175-191. 1998.
(Continued)

Primary Examiner — Steven N Leff
(74) Attorney, Agent, or Firm — Schott, P.C.

(57) ABSTRACT

The present disclosure relates to a control device for a food processing apparatus, and to a food processing apparatus, the apparatus comprising a food processing compartment (3) for a food substance, a heating unit (15) arranged to apply a heating procedure to the food substance, a weight sensor (44) arranged to monitor the weight of the processed food
(Continued)

substance, and a control device (40) that is arranged to obtain weight information for the food substance, compute a derivative signal that is indicative of a weight loss rate of the food substance, compute a characteristic value of the derivative signal, and in an initial stage of the heating procedure, based on the characteristic value, determine an estimate for an initial fat content of the food substance, for the ongoing heating procedure, and/or an estimate for a resulting fat content change for the food substance. The present disclosure further relates to a method of operating a food processing apparatus.

12 Claims, 8 Drawing Sheets

(51) Int. Cl.
| | |
|---|---|
| *A23L 17/00* | (2016.01) |
| *A23L 5/10* | (2016.01) |
| *A47J 36/32* | (2006.01) |
| *A21B 1/26* | (2006.01) |
| *F24C 15/32* | (2006.01) |

(52) U.S. Cl.
CPC .............. *A23L 13/50* (2016.08); *A23L 17/00* (2016.08); *A47J 36/321* (2018.08); *F24C 15/32* (2013.01); *A23V 2002/00* (2013.01)

(56) References Cited

U.S. PATENT DOCUMENTS

| | | | | |
|---|---|---|---|---|
| 4,338,911 A | * | 7/1982 | Smith | ................... A21B 1/245 |
| | | | | 126/21 A |
| 4,398,835 A | * | 8/1983 | Athey | ................... G01N 33/12 |
| | | | | 374/14 |
| 4,481,409 A | | 11/1984 | Smith | |
| 4,595,827 A | * | 6/1986 | Hirai | ................... H05B 6/6411 |
| | | | | 219/518 |
| 4,767,629 A | * | 8/1988 | Iglesias | ................... A23L 13/76 |
| | | | | 426/233 |
| 2006/0263900 A1 | | 11/2006 | Collins | |
| 2015/0260699 A1 | | 9/2015 | Minvielle | |
| 2016/0350715 A1 | | 12/2016 | Minvielle | |

FOREIGN PATENT DOCUMENTS

| | | |
|---|---|---|
| CN | 101336079 A | 12/2008 |
| CN | 101390706 A | 3/2009 |
| CN | 103687671 A | 3/2014 |
| EP | 701387 | 3/1996 |
| EP | 2047248 | 2/2011 |
| JP | 2014194325 | 10/2014 |
| WO | 2012/032449 | 3/2012 |
| WO | 2015135788 | 9/2015 |
| WO | 2015162131 | 10/2015 |
| WO | 2015/195575 | 12/2015 |
| WO | 2015195573 A1 | 12/2015 |

OTHER PUBLICATIONS

Wood, et al., "Effects of fatty acids on meat quality: a review", Meat Science 66 (2003) 21-32.

Goñi, et al., "Prediction of cooking times and weight losses during meat roasting", Journal of Food Engineering · Sep. 2010.

International Search Report and Written Opinion dated Mar. 26, 2018 for International Application No. PCT/EP2017/081595 filed Dec. 6, 2017.

* cited by examiner

FOOD PROCESSING APPARATUS, CONTROL DEVICE AND OPERATING METHOD

CROSS REFERENCE TO RELATED APPLICATIONS

This application is the U.S. National Phase application under 35 U.S.C. § 371 of International Application No. PCT/EP2017/081595 filed Dec. 6, 2017, published as WO 2018/104351 on Jun. 14, 2018, which claims the benefit of European Patent Application Number 17161734.3 filed Mar. 20, 2017 and Chinese Patent Application Number PCT/CN2016/000676 filed Dec. 8, 2016. These applications are hereby incorporated by reference herein.

FIELD OF THE INVENTION

The present disclosure relates to a food processing apparatus, a control device for a food processing apparatus, and to a method of operating a food processing apparatus. More particularly, the present disclosure relates to improvements in cooking appliances, particularly in so-called airbased fryers, convection, ovens and similar food preparation appliances. More specifically, but not to be understood in a limiting sense, the present disclosure relates to improvements in the preparation of fat containing food, such as meat, seafood, fish, poultry, etc.

BACKGROUND OF THE INVENTION

Nowadays, food processing apparatuses such as airbased fryers, convection ovens and similar cooking apparatuses are frequently used by professional users and, e.g. in domestic cooking applications, by non-professional users. Airbased fryers and similar cooking apparatuses are valued for their gently and healthy cooking performance. Air fried food products are generally tasty and low-fat due to the applied convection heat transfer principle.

WO 2012/032449 A1 discloses an apparatus for preparing food, comprising a food preparation chamber with an outer wall, an inner wall defining a food receiving space with an air inlet and an air discharge opening, a fan for moving a flow of hot air successively through the air inlet, the food receiving space and the discharge opening, air guide means for returning the flow of air from the discharge opening towards the air inlet separate from the food receiving space, a vent formed through the outer wall for exhausting air from the food preparation chamber to an exterior of the apparatus, and an air guide member provided to direct a portion of the flow of air towards the vent.

By way of example and not to be understood in a limiting sense, an airbased fryer may be regarded as a kitchen appliance that cooks by circulating hot air around the food. A mechanical fan circulates the hot air around the food at high speed, cooking the food and producing a crispy layer, thanks to the Maillard effect. By circulating air up to 200° C. (Celsius) or 392° F. (Fahrenheit), this appliance fries several foods like potato chips, meat, chicken, fish or pastries and it uses less oil than traditional fryers.

By using less oil to fry, food processing by airbased fryers become a healthier alternative to traditionally deep fried foods which can increase the risk of cardiovascular diseases, hypertension, diabetes, cancer and obesity.

By way of example and not to be understood in a limiting sense, a convection oven (also known as a fan-assisted oven or simply a fan oven) may be regarded as an oven that is provided with a fan to circulate air around food. Conventional ovens, which do not have fans, rely primarily on radiation from the oven walls, and to a lesser extent, on natural convection caused by temperature differences within the oven, so as to transfer heat to food. By contrast, the fans in convection ovens allow more heat to be transferred via convective heat transfer.

Airbased frying apparatuses and similar appliances provide means of preparing food by circulating a flow of hot air around the food items to heat and/or cook the food. Such an apparatus generally comprises a housing with an enclosed food preparation chamber, into which food items are placed, and wherein a flow of hot air is then circulated around the food preparation chamber to heat the food by a fan which is driven by a motor. During the heating process, steam is generated from water contained in the food, which causes the pressure in the food preparation chamber to increase. Furthermore, other liquids such as oil or fat are also discharged from the food. Therefore, a hot air vent is provided within the housing and an outlet out of the housing is provided so that the flow (e.g. air, steam, fat and/or oil constituents) under increased pressure in the food preparation chamber is entrained and emitted through the hot air vent from the food preparation chamber to an exterior of the apparatus.

It has been observed that operating a convection heating based cooking appliance still is cumbersome for unexperienced users. This applies particularly to achieving a desired doneness level for meat products, fish, poultry, etc. On the one hand, it is appreciated that airbased frying and similar cooking methods basically involve a reduction of the fat content of the prepared food product. However, on the other hand, food whose fat and water content has been reduced too much during the cooking procedure is often perceived as dry and tough and therefore not very tasty and delicate.

Hence, there is still room for improvement in convection-based food processing apparatuses, with the objective of providing tasty and delicious food, and with the objective to simplify the operation of the appliances.

SUMMARY OF THE INVENTION

In view of the above, it is an object of the present disclosure to provide a food processing apparatus and a control device for a food processing apparatus that simplify the operation of the apparatus and that increase the performance thereof. More particularly, it would be advantageous to provide a food processing apparatus that is easy to operate and that is configured for automatic and/or semi-automatic operation. Furthermore, the food processing apparatus preferably is arranged to ensure a certain quality and cooking standard also for non-experienced users.

In a first aspect of the present disclosure there is provided a food processing apparatus, the apparatus comprising:
  a food processing compartment for a food substance,
  a heating unit arranged to apply a heating procedure to the food substance,
  a weight sensor arranged to monitor the weight of the processed food substance, and
  a control device that is arranged to:
    obtain weight information for the food substance,
    compute a derivative signal that is indicative of a weight loss rate of the food substance,
    compute a characteristic value of the derivative signal, and
    in an initial stage of the heating procedure, based on the characteristic value, determine at least one of an estimate for an initial fat content of the food substance, for the ongoing heating procedure, and an estimate for a resulting fat content change for the food substance.

The above aspect is based on the insight that there is a correlation between an initial weight loss and a fat content and/or a to-be-expected fat loss of the food substance. In the initial stage of the heating procedure, the weight loss is basically attributable to water loss. It has been observed that there is a certain correlation between the water loss and at least one of the fat level and/or the fat loss. It has been further observed that characteristics of an initial water/weight loss of the food substance are indicative of a fat loss in the ongoing heating procedure and, consequently, of an ongoing cooking regime. Hence, for instance a required cooking time and/or weight loss for achieving a desired doneness level may be determined. Similarly, related cooking parameters such as temperature, etc. may be determined so as to ensure that the prepared food product is tasty and well graded.

The above correlation particularly applies to lipid (fat) containing food substances, such as meat, fish, poultry, seafood, etc. Having at least some information about the type of the food substance allows to make use of the correlation.

The correlation between the above characteristic value and the estimate (fat content and/or fat content change) may be established on the basis of empirical studies, wherein the behavior of similar food products is tested and monitored.

Generally, the characteristic value may be regarded as an extreme value of a weight loss progress and/or a weight loss rate. Based on the detected characteristic value, and based on the fat-related estimate, further process variables may be derived. This may for instance relate to an estimated processing time and/or weight loss for the food substance, a remaining processing time and/or weight loss for the food substance, a required temperature level for the food substance, a present and/or prospective doneness level, a cooking gradation level, etc.

Preferably, the heating procedure involves convection heating, such as air frying and similar cooking procedures.

More generally, at least in exemplary embodiments, based on a detected time-dependent weight loss of the food substance, a fat content and/or fat loss may be determined in consideration of the correlation established beforehand.

In an exemplary embodiment of the apparatus, the weight sensor is arranged to record a water loss of the food substance in the initial stage of the heating procedure, wherein the control device is arranged to determine, based on the detected water loss, an estimate for a resulting fat loss and/or a current fat content.

In a further exemplary embodiment, the control device is arranged to control the ongoing heating procedure in consideration of the computed estimate.

In yet another exemplary refinement, the control device is arranged to control at least one of heating temperature and heating time.

In yet another exemplary embodiment, the food substance involves fat containing meat, poultry, or seafood, wherein the control device is arranged to control the ongoing heating procedure in consideration of a desired doneness level. Generally, the food substance may involve animal fat. As used herein, seafood involves fish and fish-based products.

In yet another exemplary embodiment of the apparatus, the control device is coupled with a correlation database, wherein an empirical correlation between the characteristic value and the estimated fat content change or fat content is provided by the database. For instance, a regression curve and/or regression equation may be established. As a result, a relation between the input characteristic value and the output fat related value may be readily detected.

In yet another exemplary embodiment of the apparatus, the characteristic value is at least one of:
a maximum weight loss rate in the initial stage of the heating procedure,
a product of a maximum weight loss rate and an absolute weight loss in the initial stage of the heating procedure,
a value of an absolute weight loss in the initial stage of the heating procedure where a maximum weight loss rate is present,
an extreme value of a plot of a weight loss rate over an absolute weight loss, and
an integral of a portion of a plot of a weight loss rate over an absolute loss rate.

Needless to say, the above considerations do not require two plot respective charts and shall therefore not be understood in a limiting sense. Rather, respective differential calculations, approximate computations, etc. may be applied.

Generally, an extreme value as used herein may involve a maximum, a minimum, an inflection point, etc.

In yet another exemplary embodiment of the apparatus in the initial stage of the heating procedure, only a moderate temperature rise of the food product is induced, essentially resulting in a water loss. Preferably, a temperature rise of less than 10° K (degrees Kelvin) is applied. It has been observed that a greater temperature rise in the initial stage of the heating procedure may result in a significant fat loss already in the initial stage. This would basically compromise the prediction accuracy. However, it is preferred that a certain temperature rise is applied which involves a detectable weight loss which, however, is basically based on a water loss.

In a further exemplary embodiment, the apparatus is arranged as one of an air frying apparatus and a convection oven, wherein the apparatus comprises at least one ventilation unit. Preferably, the ventilation unit is operatively coupled with the heating unit. The ventilation unit is arranged to propel heated air, so that the air flows along and around the food substance. Hence, a convective heat transfer is induced.

In a further exemplary refinement of the apparatus, there is provided an airflow temperature sensor. Accordingly, a further control value for the operation of the food processing apparatus is present.

The apparatus may further comprise a dehumidifying unit which is arranged to process inlet air. Hence, basically dehumidified inlet air contacts the food substance so that a weight loss of the food substance is substantially attributable to evaporation.

In yet another exemplary embodiment, the apparatus further comprises a user interface, wherein the control device is supplied with food type information through the user interface, and wherein the estimated fat content change or fat content is computed in consideration of a selected food type. The food type information may involve generic information, for instance a species, etc.

Further, the user interface may comprise a recipe menu and/or a food type selector.

In a further aspect of the present disclosure a control device for a food processing apparatus is presented, the control device comprising:
an input through which data is received,
an output through which control data is signaled,
a processing unit that is arranged to obtain weight information for a food substance from a weight sensor, compute a characteristic value of the derivative signal, and in an initial stage of the heating procedure, based on the characteristic value, determine at least one of an estimate for an initial fat content for the food substance, for the ongoing heating procedure, and an estimate for a resulting fat content change for the food substance.

In still another aspect of the present disclosure there is presented a method of operating a food processing apparatus, the method comprising the following steps:

applying a heating procedure to a food substance, detecting weight information for the food substance, computing a derivative signal that is indicative of a weight loss rate of the food substance, computing a characteristic value of the derivative signal, and in an initial stage of the heating procedure, based on the characteristic value, determining at least one of an estimate for an initial fat content of the food substance, for the ongoing heating procedure, and an estimate for a resulting fat loss for the food substance.

In an exemplary embodiment, the method further comprises:

controlling the ongoing heating procedure in consideration of the computed estimate for achieving a desired doneness level.

In another exemplary embodiment of the method, the characteristic value is at least one of:

a maximum weight loss rate in the initial stage of the heating procedure, a product of a maximum weight loss rate and an absolute weight loss in the initial stage of the heating procedure, a value of an absolute weight loss in the initial stage of the heating procedure where a maximum weight loss rate is present, an extreme value of a plot of a weight loss rate over an absolute weight loss, and an integral of a portion of a plot of a weight loss rate over an absolute loss rate.

In still another aspect of the present disclosure there is presented a computer program comprising program code means for causing a computing device to carry out the steps of a method in accordance with at least one embodiment as discussed herein, wherein said computer program is carried out on a computing device that is operatively coupled with a food processing apparatus.

Preferred embodiments of the disclosure are defined in the dependent claims. It shall be understood that the claimed method has similar and/or identical preferred embodiments as the claimed apparatus and unit, and as defined in the dependent claims.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE INVENTION

Figure 1:
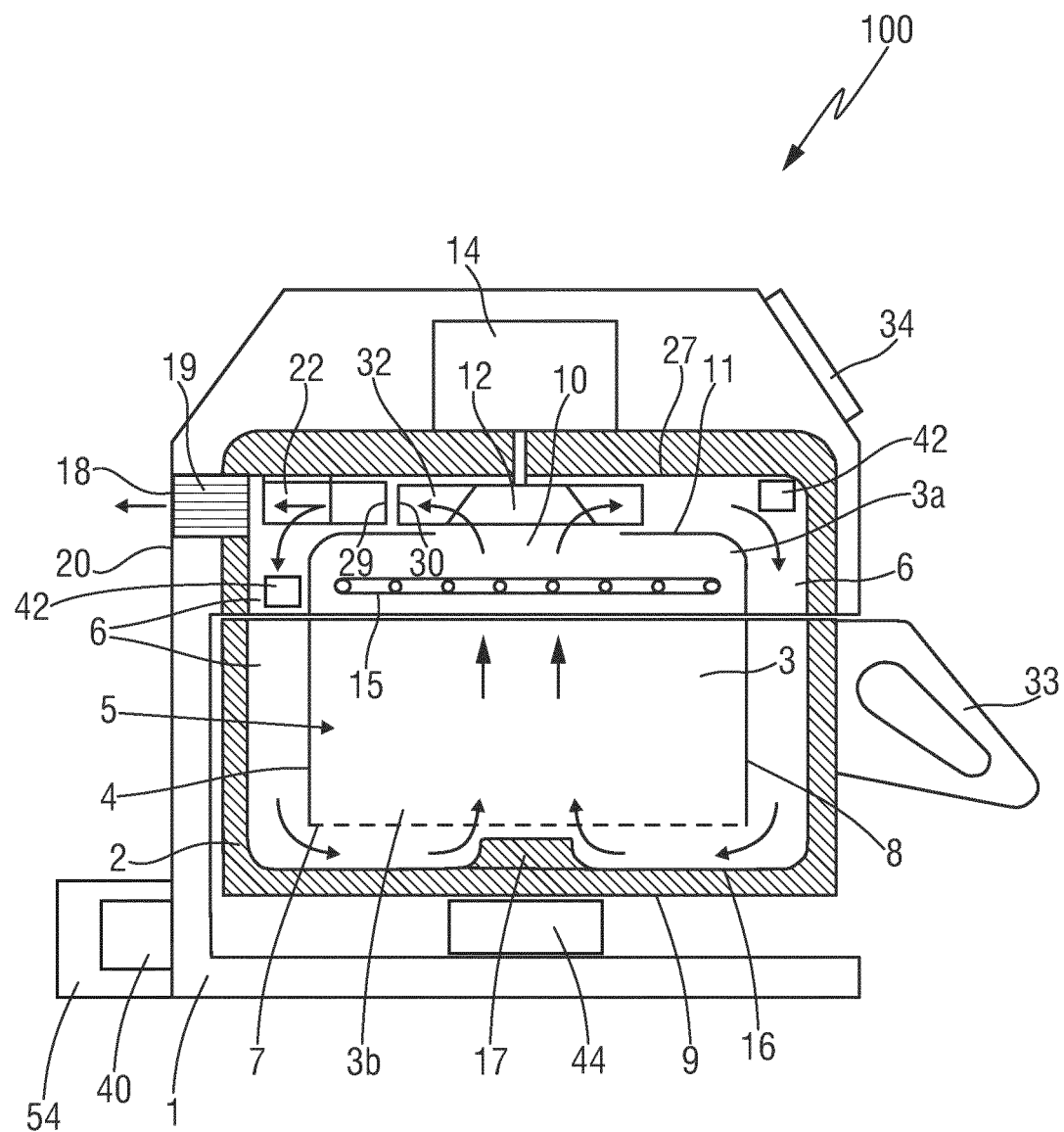
FIG. 1 shows a schematic cross-sectional view of an apparatus for processing food in accordance with the present disclosure.

An apparatus 100 for food preparation, particularly cooking, is shown in the FIG. 1. The apparatus 100 is configured to prepare food items placed therein by heating, so as to heat and/or cook the food items to prepare them for consumption.

The apparatus 100 comprises an outer shell 1. The outer shell 1 extends around an outer wall 2 which defines a food processing compartment 3. An inner wall 4 is disposed in the food processing compartment 3 and defines a food receiving space 5 in which food items to be heated and/or cooked (not shown) are received. The outer wall 2 and the inner wall 4 extend substantially parallel to and are spaced from each other to define a channel 6 therebetween, which acts as an air guide means along which hot air flows, as will be explained hereinafter.

The inner wall 4 comprises a bottom part 7 and a side wall 8 which extends around and upstands from the bottom part 7. The bottom part 7 of the inner wall 4 is provided with an air-permeable section 9 which acts as a hot air inlet to the food receiving space 5 and a top part 11 of the inner wall 4 is provided with a discharge opening 10 to allow air to flow therethrough. In an exemplary embodiment, the air permeable section 9 extends across the whole bottom part 7, although it may extend across only part of the bottom part 7. The air permeable section 9 is formed by known means, such as a mesh or grid arrangement.

A ventilating unit 12 is disposed in the food processing compartment 3, above the discharge opening 10 of the inner wall 4. The ventilating unit 12 comprises a fan, having fan blades 32, that is driven by an electric motor 14 acting as a drive means to rotate the fan. The ventilating unit 12 is operable to move a flow of hot air by sucking air from through the discharge opening 10 by means of a low pressure generated on one side of the ventilating unit 12 and expelling a high pressure flow of air into the channel 6 defined between the outer and inner walls 2,4. Therefore, air expelled from the ventilating unit 12 flows along the channel 6 acting as an air guide means defined between the outer and inner walls 2,4 to the air permeable section 9 of the inner wall 4. The air then flows through the air permeable section 9, to the food receiving space 5.

A heating unit 15 acting as a heat radiating means is disposed in an upper part 3a of the food processing compartment 3. In an exemplary embodiment, the heating unit 15 is disposed in an upper portion of the food receiving space 5 below the discharge opening 10, although it will be appreciated that the heating unit 15 may be disposed outside the inner wall 4. The heating unit 15 is arranged to heat air flowing through the upper portion of the food receiving space 5.

Furthermore, the heating unit 15 is positioned in the food receiving space 5 to radiate heat into the heat receiving space 5 and towards any food items disposed therein. Air flowing in the channel 6 between the bottom part 7 of the inner wall 4 and a base 16 of the outer wall 2, is directed to flow upwardly through the air-permeable section 9 of the inner wall 4 by means of an air deflector 17 which sits on the base 16 of the outer wall 2 and directs the flow of air upwardly.

A vent 18 is formed in the outer wall 2 of the apparatus 100 and defines an air outlet from the food processing compartment 3 to outside the apparatus 100. The vent 18 is disposed at a top end of the food processing compartment 3 and is formed at an upper end of the channel 6 proximate to the ventilating unit 12. The vent 18 and ventilating unit 12 are positioned at the top end of the food processing compartment 3 to reduce contact of liquid discharged from the food items collecting on the ventilating unit 12 and being discharged through the vent 18.

In an exemplary embodiment, the ventilating unit 12 is a radial ventilating unit and the vent 18 is formed in the outer wall 2 on a line extending in a radial direction to the axis of rotation of the ventilating unit 12.

Air guide fins 19 are formed in the vent 18 to deflect the direction of a flow of air being discharged from the food processing compartment 3 through the vent 18. The air guide fins 19 are arranged at an angle to the vent to deflect the flow of air through the vent upwardly so as to prevent hot air being exhausted directly onto a wall or surface disposed next to the apparatus 100.

Further, an air guide member 22 is provided. The air guide member 22 is an elongate member, such as a plate, with one face of the plate forming a guide surface. Although in an exemplary embodiment the air guide member is a bent plate, it will be appreciated that in other embodiments the air guide member is a flat plate or a curved plate, for example.

The air guide member 22 in an exemplary embodiment is integrally formed with at least a section of a top surface of the outer wall 2, although it is envisaged that the air guide may be fixedly mounted to the top surface of the outer wall 2 by known means, for example an adhesive or rivets.

An outer edge 29 of the air guide member 22 lies adjacent to a peripheral edge 30 of each of the fan blades 32 of the ventilating unit 12 as they rotate about the rotational axis of the ventilating unit 12. Therefore, as the ventilating unit 12 rotates, the peripheral edge 30 of each of the fan blades 32 passes the outer edge 29 of the air guide member 22. The lower end of the air guide member 22 extends below the ventilating unit 12. The ventilating unit 12 is configured to rotate in a certain direction, such that the fan blades 32 move towards the guide surface of the air guide member 22 and therefore urge the airflow thereto wards which acts to increase the pressure in the region of the vent 18.

The food processing compartment 3 is arranged in two parts, the upper part 3a and a lower part 3b. The upper part 3a is fixedly mounted to the outer shell 1 of the apparatus 100, and the lower part 3b is releasable from the upper part 3a so that it is removable from the upper part 3a to enable access to the food processing compartment 3. The lower part 3b comprises a lower section 2a, 4a of both the outer and inner walls 2,4, including the air permeable section 9 of the inner wall 4, and a handle 33 to aid the removal of the lower part 3b from shell 1 and to separate it from the upper part 3a. Therefore, the lower part 3b forms a basket or basin shaped arrangement, with an upper opening, so that food items may be placed in or removed from the food receiving space 5.

The lower part 3b of the food processing compartment is insertable in the outer shell 1 so that the lower part 3b lies flush with the upper part 3a to form the food processing compartment 3.

A user interface 34 that is arranged as a control panel is mounted to the outer shell 1 to enable the operation of the apparatus 100 to be controlled, for example the time of operation and the temperature in the food processing compartment 3.

The food processing apparatus 100 exemplarily illustrated in FIG. 1 further comprises a control device 40 that is arranged to control the operation of the apparatus 100. For instance, the control device 40 is arranged to control the heating unit 15 and/or the ventilating unit 12, particularly the motor 14 thereof. Hence, the control device 40 is arranged to control the heating flow through the appliance 100 that contacts and heats the food substance contained in the food processing compartment.

For the purpose of monitoring and/or controlling the operation of the food processing apparatus 100, at least one sensor may be incorporated. For instance, sensors 42 that are arranged as temperature sensors may be provided in or adjacent to the flow channel 6. Hence, a temperature of the treatment air flow may be detected. Further, at least in a mediate fashion, a temperature of the food substance may be detected by the temperature sensors 42. Further, the appliance 100 as shown in FIG. 1 comprises a weight sensor 44 that is arranged to detect and monitor the weight of the food substance that is processed in the food processing compartment 3. Hence, based on an initial value (food processing compartment is empty), an initial weight of the food substance may be detected. When the food substance is processed in the food processing compartment 3 by the treatment air flow, a certain weight loss may be detected.

The weight loss is attributable to a water loss and, to some extent, to a fat loss or a lipid loss. In the following, for the sake of simplicity, water loss and weight loss as detected by the weight sensor are equated. This applies in particular to the initial stage of the food processing procedure. Beneficial uses of the weight sensor 44 will be discussed in more detail hereinafter.

Figure 2:
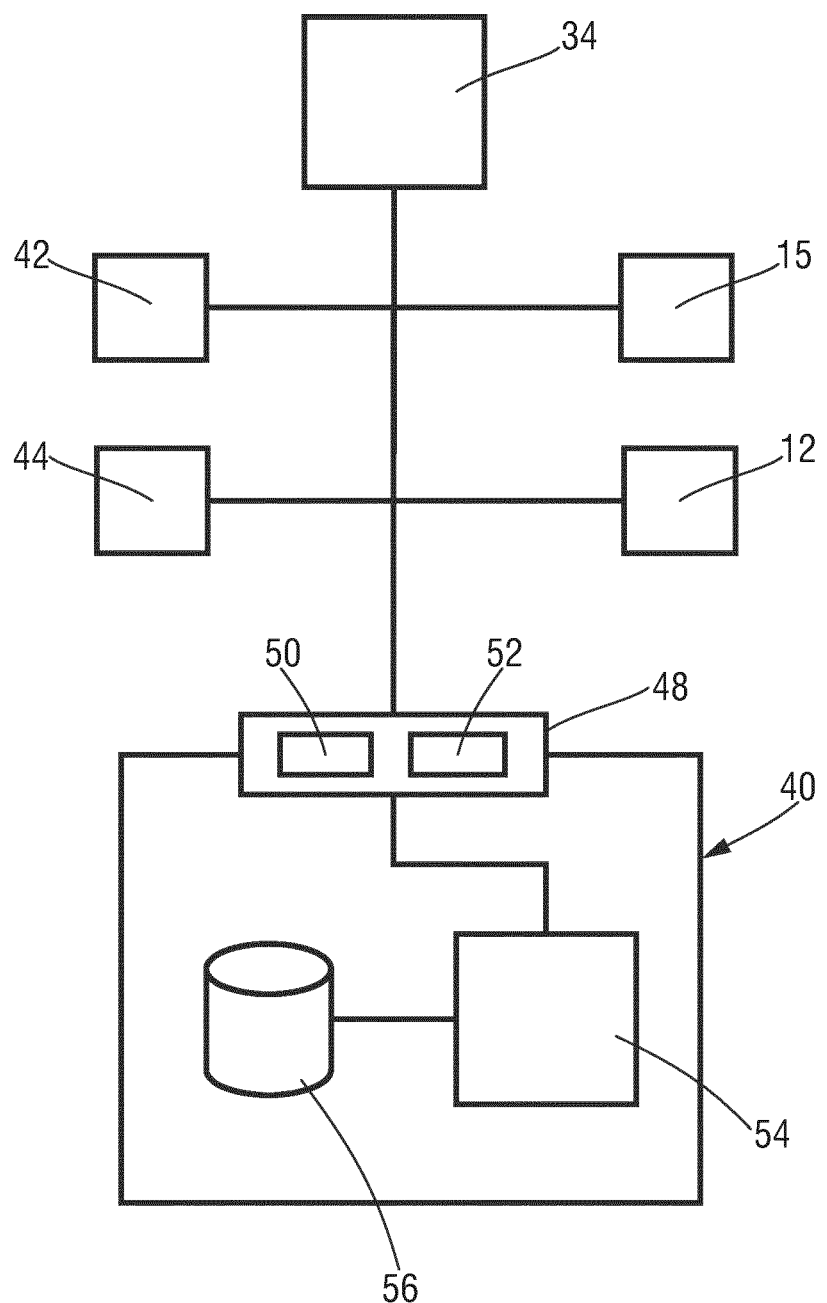
FIG. 2 shows a simplified schematic layout of a control device for a food processing apparatus in accordance with the present disclosure.

FIG. 2 shows an exemplary layout of a control device 40 that may basically correspond to the control device 40 already illustrated in FIG. 1. The control device 40 is arranged to control the operation of a food processing apparatus 100, particularly of an air frying apparatus and/or a convection oven. In at least one operation mode, the food processing apparatus may be arranged to process/prepare meat, poultry, seafood, fish, etc. Hence, the food processing apparatus 100 is arranged to process fat-containing food substances.

Generally, the control device 40 may be implemented in hardware and/or software. Combined hardware and software implementations may be envisaged. The control device 40 may be provided as a distributed system or a discrete/integrated system. Generally, the control device 40 may be incorporated in a top level control of the food processing apparatus 100. Further, in alternative embodiments, at least some modules of the control device 40 may be formed by remote devices.

The control device 40 comprises an interface 48 which may provide an input 50 and an output 52. Via the input 50 and the output 52 of the interface 48, data and information such as sensor data, control data, operation state data, user input data, status data, display data, etc. may be exchanged between the control device 40 and further units that are coupled thereto.

As already indicated above, the control device 40 may be coupled with a heating unit 15 and/or a ventilating unit 12 to control the operation of the apparatus 100. Further, as at least in some exemplary embodiments the apparatus 100 is provided with a user interface 34, the control device 40 may also be coupled thereto.

Sensor data that is gathered by at least one sensor may be obtained and processed by the control device 40. For instance, at least one temperature sensor 42 and at least one weight sensor 44 may be provided at the apparatus 100. Hence, respective sensor data may be supplied to the control device 40 via the interface 48.

The control device 40 comprises a processing unit 54 that is arranged to process and compute data. Based on input data provided via the interface 48, the processing unit 54 may process data and information based on which the apparatus 100 may be controlled and operated. The control device 40 may be further provided with a memory or database 56. In the database 56, permanently and/or temporarily stored data may be provided. For instance, correlation data, correlation equations and/or correlations models may be stored in the memory/database 56. This may for instance be the case for correlation data that describes a relation between characteristic values of an initial weight loss of the food substance and a fat content and/or a resulting fat loss for a food substance.

Needless to say, the control device 40 may also be coupled with further computing appliances, for instance with mobile phones, tablet computers, etc. Further, remote controls for the appliance 100 may be provided that are arranged to communicate with the control device 40.

Figure 3:
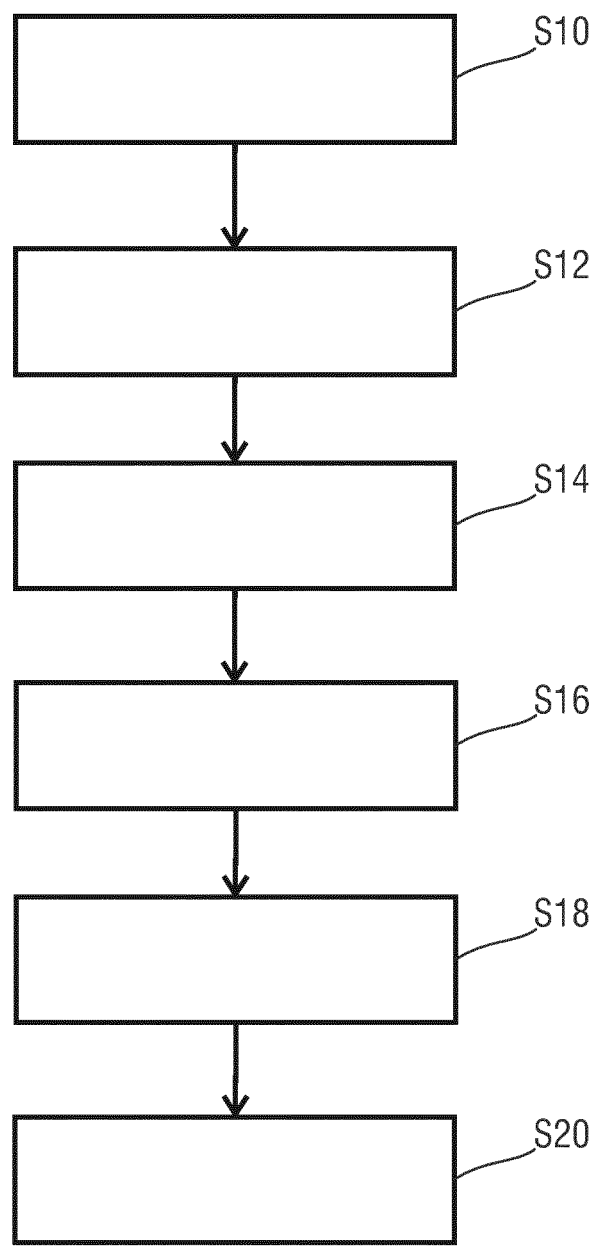
FIG. 3 shows a schematic block diagram exemplarily illustrating several steps and aspects of an embodiment of a method of operating a food processing apparatus in accordance with the present disclosure.

Further reference is made to FIG. 3, showing a simplified block diagram illustrating several steps of an exemplary embodiment of a method of controlling a food processing apparatus. The method involves a step S10 that generally relates to a heating procedure involving heating a food substance that is contained in a treatment chamber or processing compartment of the food processing apparatus.

Further, in a step S12, the food substance is monitored by means of a weight sensor that is arranged to detect and monitor weight information for the food substance. Hence, a weight loss in the course of the heating procedure may be detected.

In a further step S14, a derivative signal that is based on the monitored weight loss signal is computed. For instance, the step S14 may involve the computation of a weight loss rate, i.e. a time-dependent weight loss.

In a subsequent step S16, a characteristic value of the derivative signal computed in step S14 is processed. For instance, the step S16 may involve a computation of an extreme value such as a maximum of the derivative signal.

In a further step S18, based on the characteristic value computed in the step S16, a certain estimate that is indicative of a fat level of the food substance is determined. The estimate may relate to a current fat content of the food substance. In the alternative or in addition, the estimate may relate to a fat loss for the food substance. Both estimates may be used to control the operation of the food processing apparatus.

Consequently, in a further step S20, the ongoing heating procedure is controlled in consideration of the computed estimate. Preferably, the step S18 already takes place in an initial stage of the food processing procedure. Hence, based on an early estimate, the operation of the food processing apparatus may be adapted and, eventually, improved.

In the following, further aspects, embodiments and modifications of the above described general principles of the present disclosure will be explained and further detailed.

It has been observed that air frying of meat products typically involves a fat loss. Particularly for meat products having a considerably high fat content, a resulting fat loss occurring in the air frying procedure may be considerable. Hence, a certain effect on parameters and characteristics of the food processing procedure may be present.

As a general rule for a given food product type, high-fat samples typically lose more fat than low-fat samples during air frying, both in absolute and relative terms.

Air frying further involves a certain weight loss, particularly a water loss due to evaporation and a certain denaturation of certain proteins. Further, an actual fat content influences the water holding capacity of the food substance. It has been observed that the higher the fat content of a food product is, the higher is basically the water holding capacity during cooking.

Hence, exemplary embodiments and aspects of the present disclosure are based on the insight that for a given food type, provided that basically comparable evaporation conditions (e.g. temperature, circulation speed and humidity in an airbased fryer) are present, the higher the fat content is, the higher is the water holding capacity, and the larger is the fat loss. Hence, it is proposed to use the water loss or the weight loss as a doneness indicator. It is further proposed in this context to correlate characteristics of the weight loss in an initial stage of the cooking procedure with the resulting fat loss, involving the fat loss in proportion to the overall initial weight of the food substance and/or the fat loss in proportion to the fat content of the food substance before the food processing procedure.

An advantage of the above-described approach is that no direct fat measurement is necessary. By contrast, relatively simple and cheap weight sensors may be used so as to detect a weight loss in an initial stage of the food preparation procedure.

Such a weight sensor may be arranged to detect the weight of the whole food processing apparatus involving a detection of a weight loss due to evaporation. In the alternative or in addition, a weight sensor may be arranged to detect the weight of the food processing compartment in which the food substance is contained. This may involve that also a weight loss due to dripping and/or spilling (i.e. a liquid loss) may be detected.

Further, it is proposed to provide a user interface by which the user may choose at least a generic food type based on which a certain procedure may be performed and/or appropriate (correlation) data may be utilized by the control device of the apparatus.

In an initial food processing stage, the weight loss, primarily the water loss, is monitored. Based on characteristic of the weight loss, fat content and/or fat loss indicative information may be derived.

Reference is made to FIGS. 4 to 8. In the experiments that are reflected in FIGS. 4 to 8, chicken samples have been fried in an airbased fryer. Parameters of the food processing procedure involve a target chamber temperature of about 180° C. (degrees Celsius), core temperature 85° C., and water loss 21%. A weight sensor has been placed under the bottom of the food processing apparatus so as to detect the evaporation-induced weight loss. For verification, the fat loss has been measured by weighing the oil/fat residue that is remaining in the frying pan under the processing compartment after the cooking procedure. Using this measurement set-up, exemplary correlation data may be obtained.

Figure 4:
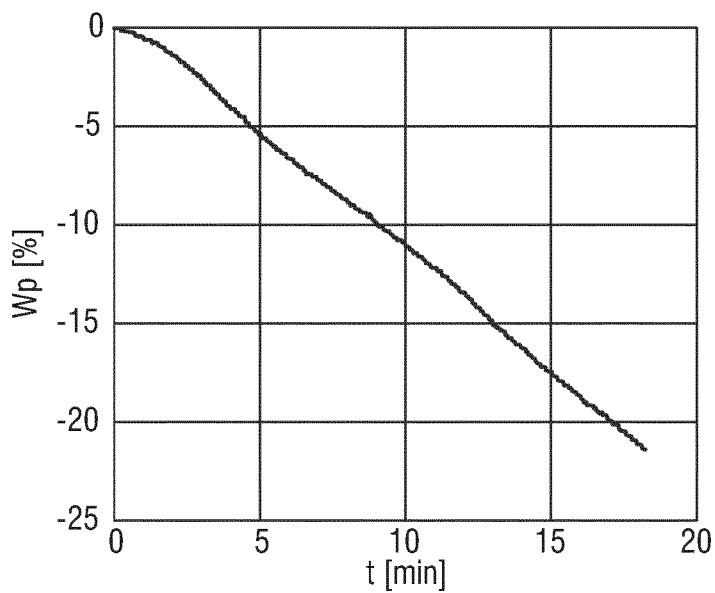
FIG. 4 is a chart illustrating an exemplary temporal weight loss of a sample food substance.

FIG. 4 illustrates an exemplary plot of a percentage water loss (Wp[%]) over time and the derivative water loss rate (dWp/dt[%/min]) during an air frying procedure applied to chicken at a chamber temperature of about 180° C.

FIG. 4 shows a curve having, at first sight, a basically constant negative slope. However, the corresponding derivative signal in FIG. 5 shows that a characteristic (absolute value) maximum water loss rate is present (in FIG. 5 at about 4.5 min).

Figure 5:
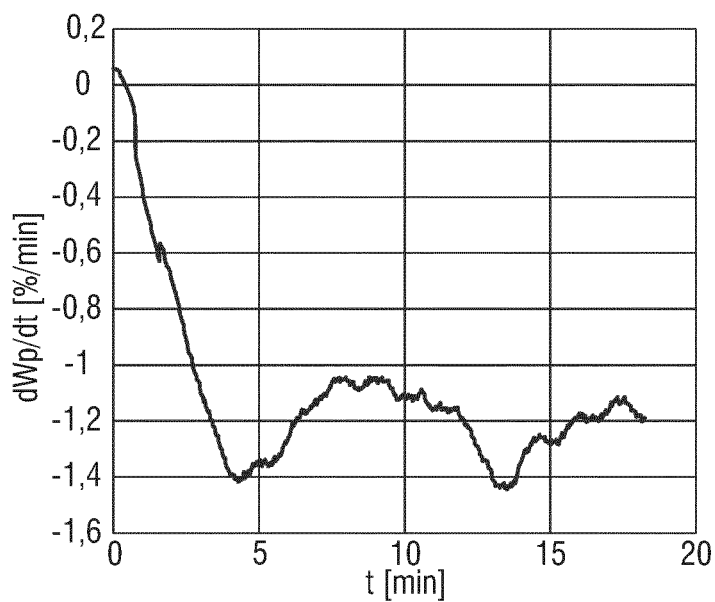
FIG. 5 is a chart showing a temporal derivative of the chart shown in FIG. 4.

FIG. 5 shows that the rate of the water loss exhibits a characteristic four-phase profile including a section at the very beginning wherein the (absolute value) rate is rapidly increased which is attributable to the presence and evaporation of free water in the raw chicken meat. A limited fraction (about 5%) of the overall weight may be so-called free water. Beyond the peak that delimits the first phase, there is further phase wherein the (absolute value) rate is reduced as the free water is already considerably depleted. Hence, a local (absolute value) minimum is reached (in FIG. 5 at a time between 8 and 9.5 min).

In a further, third phase, the (absolute value) rate again increases as an increasing amount of water can be released and evaporated due to protein denaturation. A corresponding (absolute value) maximum of the rate is present in FIG. 5 at about 13 to 14 min. Having passed the (absolute value) maximum, the rate is again reduced as eventually the protein denaturation is slowed and stalled. Consequently, the water loss is reduced as only a small remainder of the originally present water is still present in the food substance.

Figure 6:
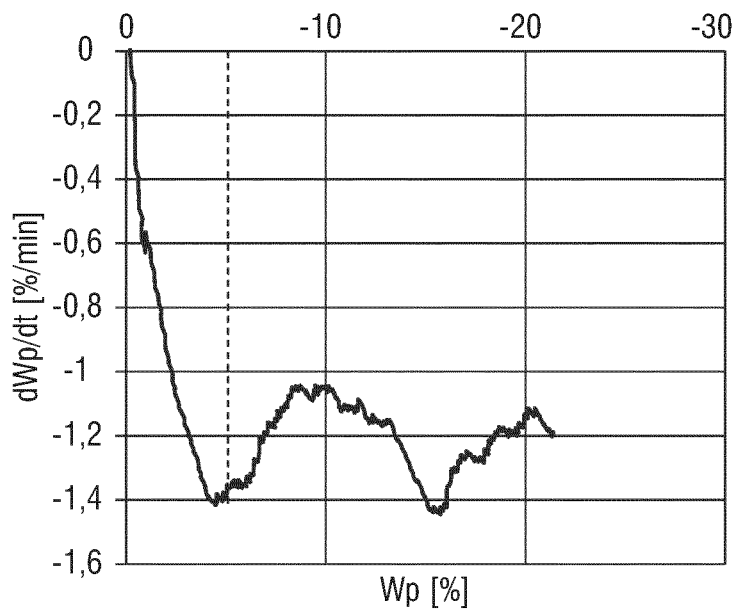
FIG. 6 is a chart plotting the signal shown in FIG. 5 over an absolute weight loss.

FIG. 6 shows a further chart including a plot of the rate of the water loss (dWp/dt [%/min]) over the absolute water loss (Wp [%]). Basically, the chart shown in FIG. 6 resembles the chart shown in FIG. 5. However, different units are represented by the respective X-coordinate.

Figure 7:
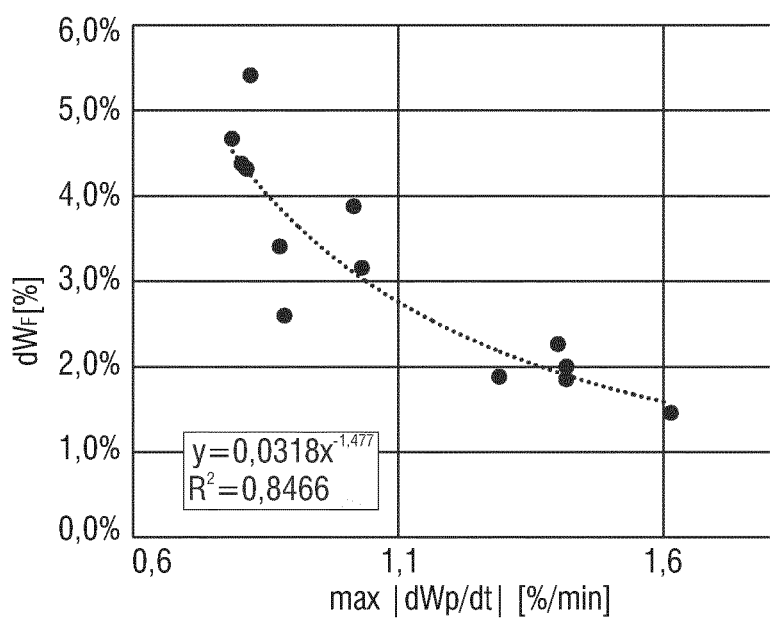
FIG. 7 is an exemplary correlation chart illustrating a relation between an extreme value of a weight loss rate and a resulting estimated fat loss.
Figure 8:
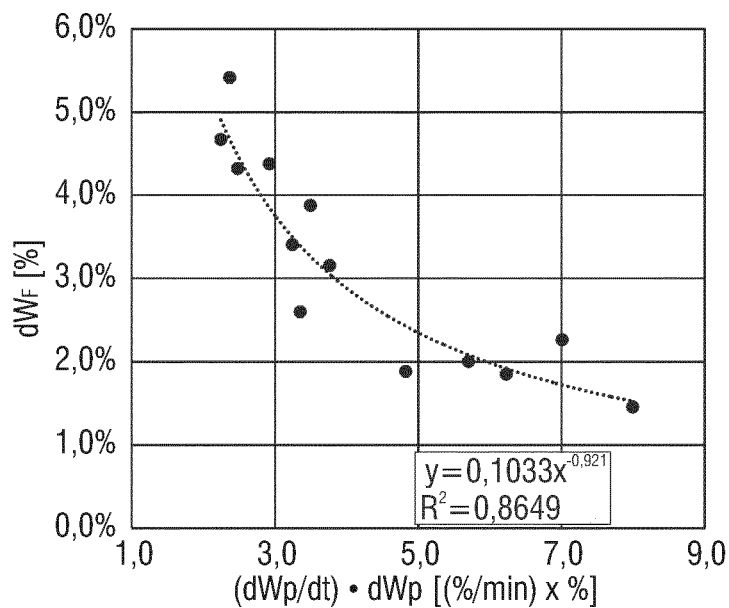
FIG. 8 is a further correlation chart illustrating a relation between a product of a maximum of an initial water loss rate and an absolute water loss, and a resulting fat loss.

FIG. 7 and FIG. 8 illustrate respective correlation charts that are based on a verification check using thirteen different chicken samples. Based on the thirteen characteristic values, a correlation curve has been computed both in FIG. 7 and in FIG. 8. The correlation curve illustrated in FIG. 8 uses the same samples as the correlation curve of FIG. 7. FIG. 7 illustrates a correlation of the estimated resulting fat loss [%] and the first (absolute value) maximum water loss rate [%/min]. In FIG. 8, a correlation between the absolute fat loss [%] and a product of the (absolute value) maximum water loss rate and the corresponding (absolute value) water loss is illustrated.

Hence, based on the data provided in FIG. 7 and FIG. 8, a fat loss estimate for further chicken sample may be deduced from the detection of initial water/weight loss characteristics.

The water loss and/or water loss rate in an initial stage of the food processing procedure may be processed and, eventually, based on characteristics of the water loss data, an estimate for the fat loss may be derived.

Another exemplary application that makes use of at least some of the above-presented aspects and embodiments of the present disclosure is described and further detailed hereinafter with reference to FIG. 9 to FIG. 12.

The data underlying FIG. 9 to FIG. 12 is based on an investigation of fish samples involving the following species:

| food type/species | total fat/lipid content [%] | total weight loss End-dWp [%] |
|---|---|---|
| Alaska Pollock | 0.41 | 40 |
| Alaska Cod | 0.7 | 30 |
| Greenland Halibut | 2.3 | 24 |
| Basafish | 5.94 | 22 |
| Coho Salmon | 10.6 | 19 |
| Sablefish | 10.8 | 18 |

In the above table, typical lipid/fat characteristics and a typical resulting weight loss for the respective species is indicated. The samples have been processed in an airbased fryer that is operating at an air temperature of about 180° C. (degrees Celsius), wherein a core temperature of about 65° C. has been pursued as a doneness indicator.

The above table further shows that even for related types of fish different characteristics are present that require a different treatment in the food processing apparatus.

Figure 9:
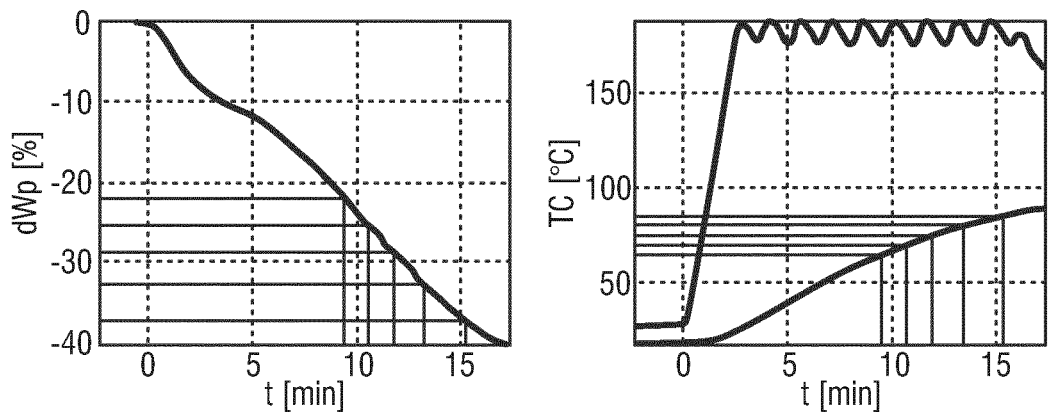
FIG. 9 shows four charts illustrating an initial stage of a food preparation procedure for a sample food substance comprising an absolute weight loss over time (upper left chart), temperature over time (upper right chart), a weight loss rate over time (bottom left chart), and a weight loss rate over an absolute weight loss (bottom right chart)
Figure 9:
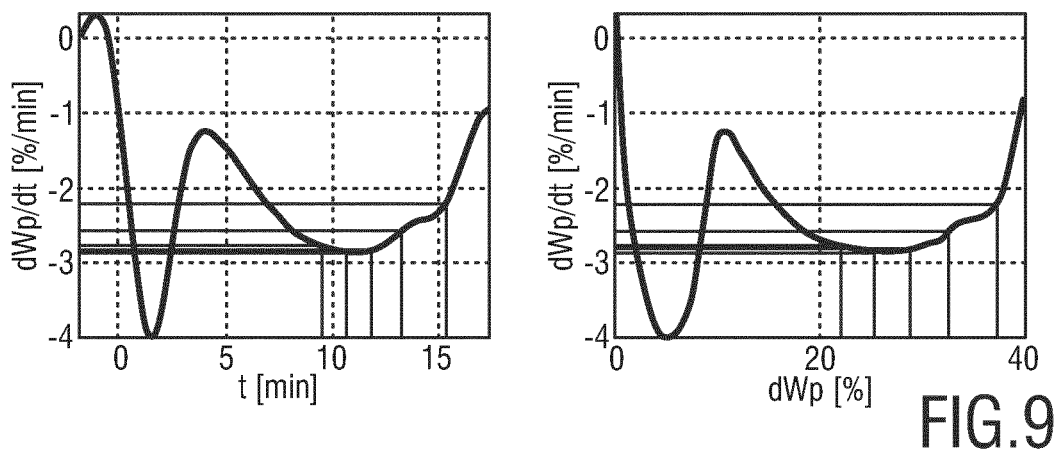

In this context, reference is made to FIG. 9 illustrating four charts that represent characteristics of the processed food substance and/or the treatment procedure. The charts of FIG. 9 are based on fish samples. Apart from that, the concept of the upper left chart of FIG. 9 is similar to FIG. 4. The concept of the bottom left chart of FIG. 9 is similar to FIG. 5. The concept of the bottom right chart of FIG. 9 is similar to FIG. 6. In addition, the upper right chart of FIG. 9 illustrates a set air flow temperature (about 180° C.) and a resulting core temperature of the food product.

Generally, the principles of and conclusions drawn from the charts of FIG. 9 are similar to the charts of FIG. 4, FIG. 5 and FIG. 6 which are based on chicken meat samples.

Figure 10:
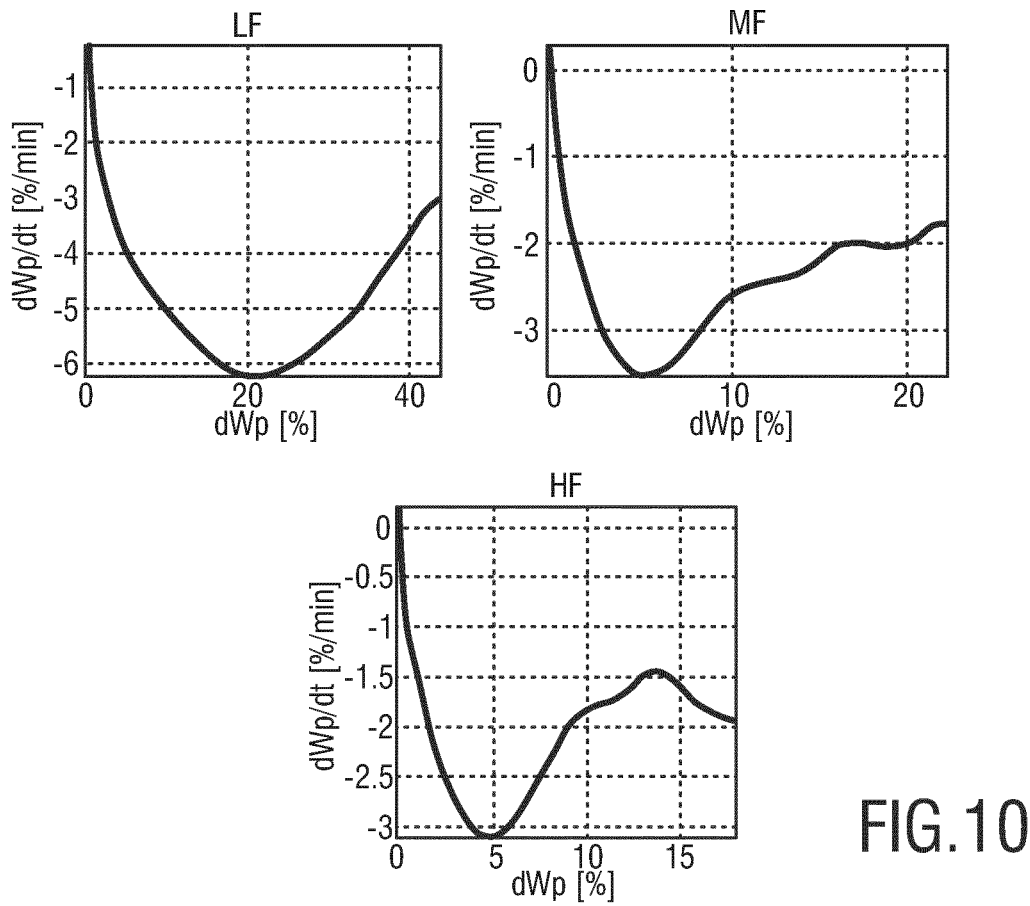
FIG. 10 shows illustrative plots of a weight loss rate over an absolute weight loss for a low fat food substance (chart indicated by LF), a medium fat food substance (chart indicated by MF), and a high-fat food product (chart indicated by HF)

In FIG. 10, three charts are illustrated that represent a relation between a weight loss rate (dWp/dt[%/min]) and (absolute value) weight loss (dWp [%]). The relation illustrated in FIG. 10 corresponds to the relation illustrated in FIG. 6 and illustrated in the bottom right chart of FIG. 9.

In FIG. 10, the chart LF represents a fish sample having a considerably low fat content. The chart HF represents a fish sample having a relatively high fat content. The chart MF of FIG. 10 represents a fish sample having a medium fat content. In either case, a considerable (absolute value) maximum of the weight loss rate is present in an initial state of the food processing procedure.

Figure 11:
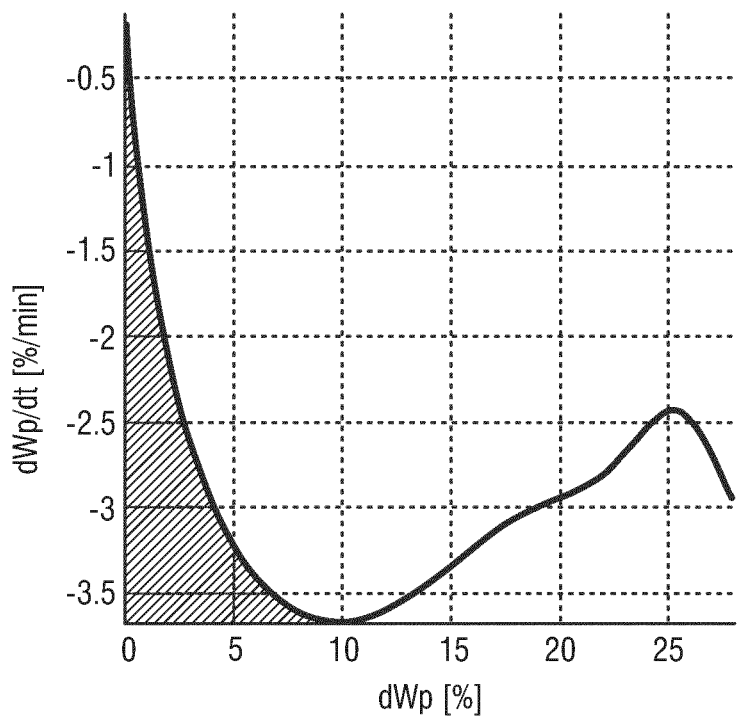
FIG. 11 is a further exemplary plot illustrating a weight loss ratio over an absolute weight loss in an initial stage of a food preparation procedure, wherein an integral portion corresponding to a certain surface of the chart is highlighted.

FIG. 11 is yet another chart illustrating a relation between the weight loss rate and the absolute weight loss of a fish sample. In FIG. 11, a certain portion of the chart is highlighted. It has been observed that the area under the curve between the origin (dWp=0) and the first inflection or (absolute value) maximum (dWp is about 10%) can be used as a measure for an estimation of the fat content (lipid content) and, consequently for an estimation of the resulting fat loss and, as a consequence, for doneness determination.

The area highlighted in FIG. 11 may also be referred to as "triangle" hereinafter. It has been observed that at least one of the width, height and the area of the "triangle" is indicative of the fat content.

Figure 12:
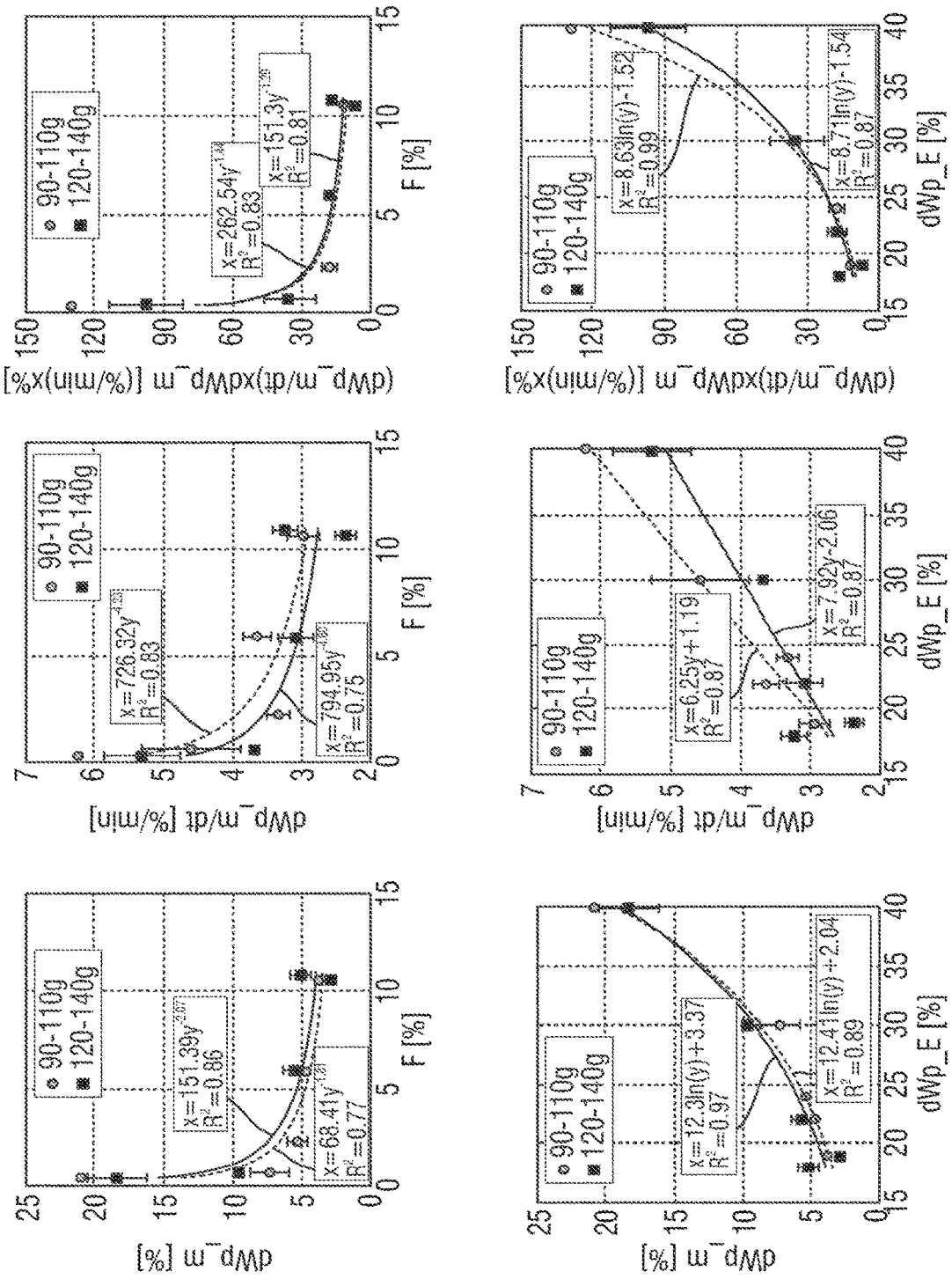
FIG. 12 is a series of six sample charts illustrating a relationship between a water/weight loss and fat content in sample food substances.

The hypotheses and concepts elucidated further above have been applied to further sample measurements that are illustrated in FIG. 12. In FIG. 12, several (fish) species having different initial weights have been tested so as to derive a correlation between characteristics of the monitored data and the fat content (lipid content) and the resulting weight loss of the finished food product (dWp_E [%]) when reaching the defined core temperature of about 65° C. In FIG. 12, the fish species already indicated in the above table have been tested. Two groups of Fish have been defined, due to their initial weight. In either case, a regression formula and/or a correlation curve can be established.

In FIG. 12, the upper row of charts relates, at the X-coordinate, to the fat content. The bottom row of charts relates, at the X-coordinate, to the resulting weight loss (dWp_E) when the target core temperature is reached.

Further, the left column charts relate, at their Y-coordinate, to the absolute weight loss where the inflection point in the weight loss rate signal is present, refer to the width of the "triangle" illustrated in FIG. 11. The middle column of FIG. 12 involves charts that relate, at their Y-coordinate, to the weight loss rate at the aforementioned inflection point which corresponds to the height of the "triangle" in FIG. 11. Further, the right column in FIG. 12 involves charts that relate, at their Y-coordinate, to an area of the "triangle" illustrated in FIG. 11.

Hence, the correlations illustrated in FIG. 12 can be used for further samples so as to provide an estimate of at least one of the absolute fat content and/or a resulting weight loss of the finished food product. Based on the estimate, the ongoing food processing procedure may be controlled in a more accurate and case-sensitive fashion.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A food processing apparatus, comprising:
a food processing compartment for a food substance,
a heating unit arranged to apply a heating procedure to the food substance,
a weight sensor arranged to monitor a weight of the food substance that is processed in the food processing compartment, and
a control device that is arranged to:
  obtain weight information for the food substance during the heating procedure,
  compute a derivative signal that is indicative of a weight loss rate of the food substance,
  compute a characteristic value of the derivative signal at least by computing an absolute weight loss rate of the food substance from the weight loss rate,
  in an initial stage of the heating procedure, based on the characteristic value, determine at least one of: an estimate for an initial fat content of the food substance for the ongoing heating procedure, or an estimate for a resulting fat content change for the food substance, and
  control the ongoing heating procedure for achieving a desired doneness level based on the determined at least one of: the estimate for the initial fat content, or the estimate for the resulting fat content change.

2. The food processing apparatus as claimed in claim 1, wherein the weight sensor is arranged to record a water loss of the food substance in the initial stage of the heating procedure, and wherein the control device is arranged to determine, based on the recorded water loss, an estimate for a resulting fat loss and/or a current fat content.

3. The food processing apparatus as claimed in claim 1, wherein the control device is arranged to control the ongoing heating procedure based on the determined estimate for the initial fat content of the food substance.

4. The food processing apparatus as claimed in claim 1, wherein the control device is arranged to control at least one of: a heating temperature or a heating time.

5. The food processing apparatus as claimed in claim 1, wherein the food substance involves fat containing meat, poultry, or seafood, and wherein the control device is arranged to control the ongoing heating procedure further based on the desired doneness level.

6. The food processing apparatus as claimed in claim 5, wherein the desired doneness level, for a required cooking time and/or weight loss, is determined based on a water loss or a weight loss of the food substance.

7. The food processing apparatus as claimed in claim 1, wherein the control device is coupled with a correlation database, and wherein an empirical correlation between the characteristic value and the estimated resulting fat content change or the estimated initial fat content is provided by the correlation database.

8. The food processing apparatus as claimed in claim 1, wherein the characteristic value is at least one of:
a maximum weight loss rate in the initial stage of the heating procedure,
a product of a maximum weight loss rate and an absolute weight loss in the initial stage of the heating procedure,
a value of an absolute weight loss in the initial stage of the heating procedure, where a maximum weight loss rate is present,
a value of a plot of the weight loss rate over an absolute weight loss, or
an integral of a portion of a plot of the weight loss rate over the absolute weight loss rate.

9. The food processing apparatus as claimed in claim 1, wherein, in the initial stage of the heating procedure, a temperature rise in the food substance is induced resulting in a water loss.

10. The food processing apparatus as claimed in claim 1, wherein the food processing apparatus is arranged as one of: an airbased frying apparatus or a convection oven, and wherein the food processing apparatus comprises at least one ventilation unit.

11. The food processing apparatus as claimed in claim 1, further comprising an air flow temperature sensor.

12. The food processing apparatus as claimed in claim 1, further comprising a user interface, wherein the control device is supplied with food type information through the user interface, and wherein the determination of the estimate of the resulting fat content change or the estimate of the initial fat content is computed based on selected food type information.

* * * * *